US006542869B1

(12) United States Patent
Foote

(10) Patent No.: US 6,542,869 B1
(45) Date of Patent: Apr. 1, 2003

(54) METHOD FOR AUTOMATIC ANALYSIS OF AUDIO INCLUDING MUSIC AND SPEECH

(75) Inventor: Jonathan Foote, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/569,230

(22) Filed: May 11, 2000

(51) Int. Cl.[7] .............................................. G10L 15/04
(52) U.S. Cl. ..................... 704/500; 704/200.1; 704/231; 704/210
(58) Field of Search ................. 704/500, 200.1, 704/270, 270.1, 200, 231, 233, 251, 253, 257, 210, 205, 207, 246, 250

(56) References Cited

U.S. PATENT DOCUMENTS

| 5,227,892 A | 7/1993 | Lince ........................... 358/335 |
| 5,598,507 A | 1/1997 | Kimber et al. .............. 395/2.55 |
| 5,655,058 A | 8/1997 | Balasubramanian et al. ..... 395/2.65 |
| 5,659,662 A | 8/1997 | Wilcox et al. .............. 395/2.54 |
| 5,828,994 A | 10/1998 | Covell et al. ................. 704/211 |
| 5,918,223 A * | 6/1999 | Blum et al. ...................... 707/1 |
| 5,986,199 A * | 11/1999 | Peevers ......................... 84/603 |
| 6,185,527 B1 * | 2/2001 | Petkovic et al. ............. 704/231 |
| 6,370,504 B1 * | 4/2002 | Zick et al. ................ 704/200.1 |

OTHER PUBLICATIONS

ICME 2000. IEEE International Conference on Multimedia and Expo, 2000. Foote, "Automatic audio segmentation using measure of audio novelty". pp. 452–455 vol. 1, Aug. 2000.*
Applications of Signal Processing to Audio and Acoustics, 1999 IEEE Workshop. Tzanetakis et al., "Multifeature audio segmentation for browsing and annotation". pp. 103–106. Oct. 1999.*

Kimber, D. and Wilcox, L., "Acoustic Segmentation for Audio Browsers," in *Proc. Interface Conference*, Sydney, Australia, 1996, 10 pp.
Arons, B., "SpeechSkimmer: A System for Interactively Skimming Recorded Speech," *ACM Trans. on Computer Human Interaction*, Mar. 1997, vol. 4, No. 1, pp. 3–38. (http://www.media.mit.edu/~barons/tochi97.html).
Bregman, A. S., *Auditory Scene Analysis: Perceptual Organization of Sound*, Bradford Books, 1990.
Eckmann, J.P. et al., "Recurrence Plots of Dynamical Systems," *Europhys. Lett.*, vol. 4 (9), pp. 973–977, Nov. 1, 1987.
Foote, J., "Content–Based Retrieval of Music and Audio," *SPIE*, 1997, vol. 3229, pp. 138–147.

(List continued on next page.)

*Primary Examiner*—Richemond Dorvil
(74) *Attorney, Agent, or Firm*—Fliesler Dubb Meyer & Lovejoy LLP

(57) ABSTRACT

A method for determining points of change or novelty in an audio signal measures the self similarity of components of the audio signal. For each time window in an audio signal, a formula is used to determine a vector parameterization value. The self-similarity as well as cross-similarity between each of the parameterization values is then determined for all past and future window regions. A significant point of novelty or change will have a high self-similarity in the past and future, and a low cross-similarity. The extent of the time difference between "past" and "future" can be varied to change the scale of the system so that, for example, individual musical notes can be found using a short time extent while longer events, such as musical themes or changing of speakers, can be identified by considering windows further into the past or future. The result is a measure of the degree of change, or how novel the source audio is at any time. The method can be used in a wide variety of applications, including segmenting or indexing for classification and retrieval, beat tracking, and summarizing of speech or music.

36 Claims, 8 Drawing Sheets

OTHER PUBLICATIONS

Foote, J., "Visualizing Music and Audio Using Self–Similarity," *ACM Multimedia '99* 10/99, Orlando, Florida.

Foote, J.T. and Silverman, H.F., "A Model Distance Measure for Talker Clustering and Identification," pp. I–317–I–320, Apr. 1994, IEEE.

Gish et al., "Segregation of Speakers for Speech Recognition and Speaker Identification," *IEEE*, Jul. 1991, vol. 2, pp. 873–876.

Goto, M. and Muraoaka, Y., "A Beat Tracking System for Acoustic Signals of Music," *Proc. ACM Multimedia 1994*, San Francisco, ACM, pp. 365–372.

Johnson, P., "sci–skeptic FAQ.: The Frequently Questioned Answers" *http://www.fags.org/fags/skeptic–faq/index.html*, Apr. 21, 1996.

Rabiner, L. and Juang, B.–H., *Fundamentals of Speech Recognition*, PTR, Prentice Hall, Englewood Cliffs, New Jersey, 1993.

Scheirer, E.D., "Tempo and Beat Analysis of Acoustic Musical Signals," *J. Acoust. Soc. Am.*, vol. 103, No. 1, Jan. 1998, pp. 588–601.

Scheirer, E.D., Using Musical Knowledge to Extract Expressive Performance Information from Audio Recordings, Sep. 30, 1996, Nikos Drakos, Computer Based Learning Unit, University of Leeds (http://sound.media.mit.edu/~eds/papers/html/ijcai95/).

Shepard, R., "Representations of Structure in Similar Data: Problems and Prospects," *Psychometrica*, Dec. 1974, vol. 39, No. 4, pp. 373–421.

Siu et al., "An Unsupervised, Sequential Learning Algorithm for the Segmentation of Speech Waveforms with Multiple Speakers," IEEE, Sep. 1992, pp. II–189–II–192.

Slaney, M., "Auditory Toolbox," Jan. 19, 1999, (http://sound.media.mit.edu/dpwe–bin/mhmessage.cgi/Audiotry/postings/1999/21).

Sprenger, S., "Time and Pitch Scaling of Audio Signals," Nov. 1999, *http://www.dspdimension.com/html/timepitch.html*.

Sugiyama et al., "Speech Segmentation and Clustering Based on Speaker Features," IEEE, Apr. 1993, pp. II–395–II–398.

* cited by examiner

First bars of Bach's Prelude No. 1 in C Major, BVW 846, from The Well-Tempered Clavier Similarity visualization of Bach's *Prelude No. 1*
Glenn Gould performance Similarity visualization of Bach's *Prelude No. 1*
Acoustic realization from MIDI data 64 X 64 checkerboard kernel with Gaussian taper Novelty score for Gould performance and different kernel widths Gould performance showing note boundaries Novelty score from first minute of Animals Have Young "Beat spectrum" of Gould performance from diagonal sum Beat spectrum of jazz composition *Take 5*

Self-similarity of *Symphony No. 5* von Karijan performance

Self-similarity of *Symphony No. 5* Carlos Kleiber performance

METHOD FOR AUTOMATIC ANALYSIS OF AUDIO INCLUDING MUSIC AND SPEECH

BACKGROUND OF THE INVENTION

1. Field of the Invention

The present invention relates to a method for identifying changes in an audio signal which may include music, speech, or a combination or music and speech. More particularly, the present invention relates to the identification of changes in the audio for the purpose of indexing, summarizing, beat tracking, or retrieving.

2. Description of the Related Art

With video signals, frame-to-frame differences provide a useful measure of overall changes or novelty in the video signal content. Frame-to-frame differences can be used for automatic segmentation and key frame extraction, as well as for other purposes.

A similar measure for determining significant changes or novelty points in audio might have a number of useful applications. But, computing audio changes or boundaries is significantly more difficult than video. Straightforward approaches like measuring spectral differences are typically not useful because too many false alarms occur, since the typical spectra for speech and music is in constant flux.

A typical approach to audio segmentation is to detect silences. Such a system is disclosed by Arons, B. in "SpeechSkimmer: A system for interactively skimming recorded speech." *ACM Trans. On Computer Human Interaction*, 4(1):3–38, Match 1997. A procedure for detecting silence works best for speech, even though silences in the speech signal may have little or no semantic significance. Much audio such as popular music or reverberant sources, may contain no silences at all, and the silence based segmentation methods will fail.

Another approach, termed "Auditory Scene Analysis" tries to detect harmonically and temporally related components of sound. Such an approach is described by A. Bregman in "Auditory Scene Analysis: Perceptual Organization of Sound", *Bradford Books*, 1994. Typically the Auditory Scene Analysis procedure works only in a limited domain, such as a small number of sustained and harmonically pure musical notes. For example, the Bregman approach looks for components in the frequency domain that are harmonically or temporally related. Typically rules are assumptions are used to define what "related" means, and the rules typically work well only in a limited domain.

Another approach uses speaker identification to segment audio by characteristics of an individual. Such a system is disclosed by Siu et al., "An Unsupervised Sequential Learning Algorithm For The Segmentation Of Speech Waveforms With Multiple Speakers", *Proc. ICASSP*, vol. 2, pp. 189–192, March 1992. Though a speaker identification method could be used to segment music, it relies on statistical models that must be trained from a corpus of labeled data, or estimated by clustering audio segments.

Another approach to audio segmentation operates using musical beat-tracking. In one approach to beat tracking correlated energy peaks across sub-bands are used. See Scheirer, Eric D., "Tempo and Beat Analysis of Acoustic Musical Signals:, *J. Acoust. Soc. Am*. 103(10), pp. 588–601. Another approach depends on restrictive assumptions such as the music must be in 4/4 time and have a bass drum on the downbeat. See, Gogo, M. and Y. Muraoka, "A Beat Tracking System for Acoustic Signals of Music," in Proc. *ACM Multimedia* 1994, San Francisco, ACM.

SUMMARY OF THE INVENTION

In accordance with the present invention a method is provided to automatically find points of change in music or audio, by looking at local self-similarity. The method can identify individual note boundaries or natural segment boundaries such as verse/chorus or speech/music transitions, even in the absence of cues such as silence.

The present invention works for any audio source regardless of complexity, does not rely on particular acoustic features such as silence, or pitch, and needs no clustering or training.

The method of the present invention can be used in a wide variety of applications, including indexing, beat tracking, and retrieving and summarizing music or audio. The method works with a wide variety of audio sources.

The method in accordance with the present invention finds points of maximum audio change by considering self-similarity of the audio signal. For each time window in the audio signal, a formula, such as a Fast Fourier Transform (FFT), is applied to determine a parameterization value vector. The self-similarity as well as cross-similarity between each of the parameterization values is determined for past and future windows. A significant point of novelty or change will have a high self-similarity in the past and future, and a low cross-similarity. The extent of the time difference between "past" and "future" can be varied to change the scale of the system so that, for example, individual notes can be found using a short time extent while longer events, such as musical themes, can be identified by considering windows further into the past or future. The result is a measure of how novel the source audio is at any time.

Instances when the difference between the self-similarity and cross-similarity measures are large will correspond to significant audio changes, and provide good points for use in segmenting or indexing the audio. Periodic peaks in the difference measurement can correspond to periodicity in the music, such as rhythm, so the method in accordance with the present invention can be used for beat-tracking, that is, finding the tempo and location of downbeats in music. Applications of this method include:

Automatic segmentation for audio classification and retrieval.

Audio indexing/browsing: jump to segment points.

Audio summarization: play only start of significantly new segments.

Audio "gisting:" play only segment that best characterizes entire work.

Align music audio waveforms with MIDI notes for segmentation

Indexing/browsing audio: link/jump to next novel segment

Automatically find endpoints points for audio "smart cut-and-paste"

Aligning audio for non-linear time scale modification ("audio morphing").

Tempo extraction, beat tracking, and alignment

"Auto DJ" for concatenating music with similar tempos.

Finding time indexes in speech audio for automatic animation of mouth movements

Analysis for structured audio coding such as MPEG-4

The method in accordance with the present invention, thus, produces a time series that is proportional to the novelty of an acoustic source at any instant. High values and peaks correspond to large audio changes, so the novelty score can be thresholded to find instances which can be used as segment boundaries.

BRIEF DESCRIPTION OF THE DRAWINGS

Further details of the present invention are explained with the help of the attached drawings in which.

DETAILED DESCRIPTION

Figure 1:
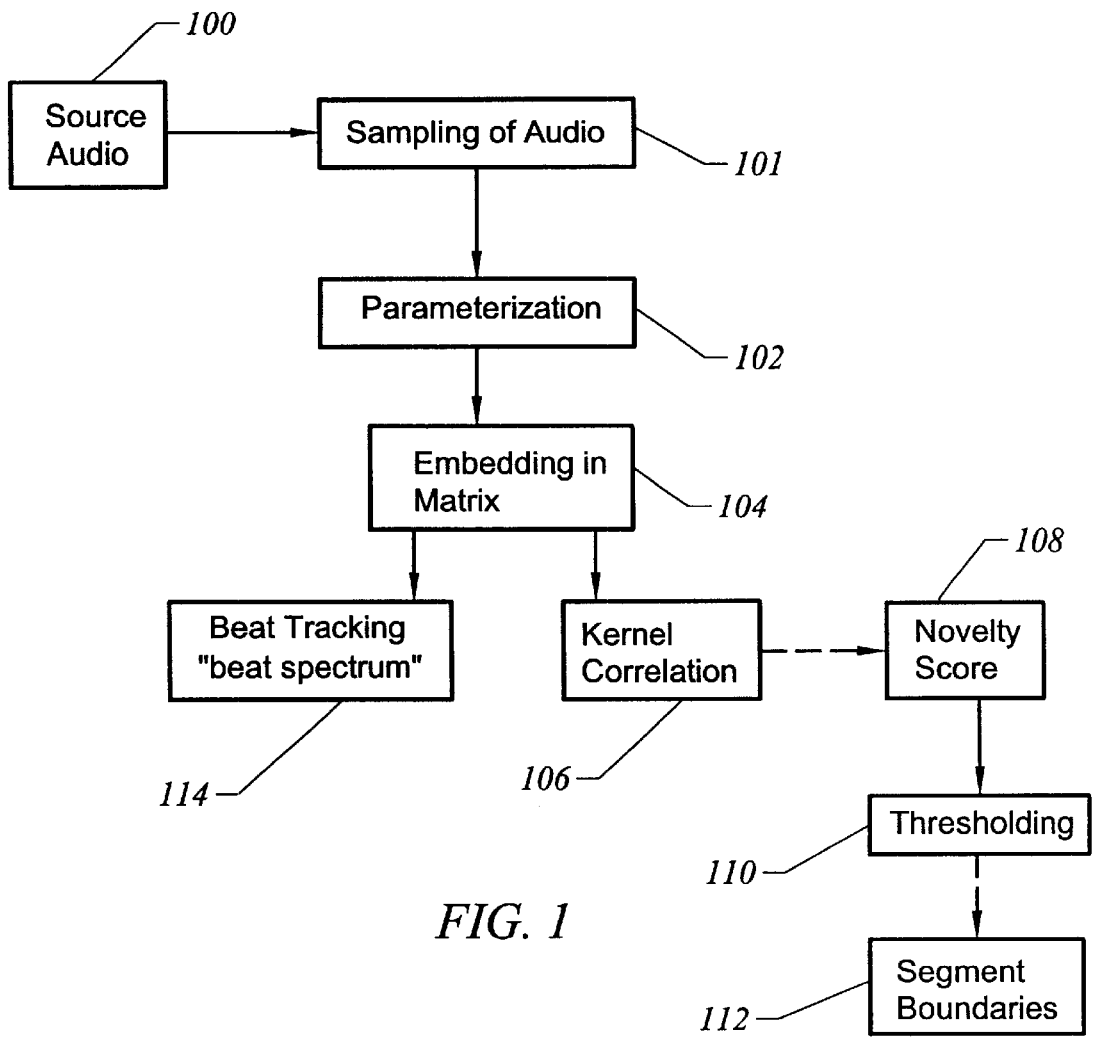
FIG. 1 is a flow chart illustrating the steps of the method of analysis in accordance with the present invention.

FIG. 1 is a flow chart illustrating the steps of the method of analysis of audio in accordance with the present invention.

I. Sampling Source Audio

In the first step 101, the source audio 100 is sampled. Such sampling is done by windowing portions of the audio wave-form. Variable window widths and overlaps can be used. For example, a window may be 256 samples wide, with overlapping by 128 points. For audio sampled at 16 kHz, this results in a 16 mS frame width and a 125 per second frame rate.

II. Parameterization

In a second step 102, the sampled audio signal is parameterized. Each frame is parameterized using an analysis function that provides a vector representation of the audio signal portion such as a Fourier transform, or a Mel-Frequency Cepstral Coefficients (MFCC) analysis. Other parameterization methods include ones based on linear prediction, psychoacoustic considerations or potentially a combination of techniques, such as a Perpetual Linear Prediction.

For examples presented subsequently herein, each analysis frame is windowed with a 256-point Hamming window and a Fast Fourier transform (FFT) is used for parameterization to estimate the spectral components in the window. The logarithm of the magnitude of the result of the FFT is used as an estimate of the power spectrum of the signal in the window. High frequency components are discarded, typically those above one quarter of the sampling frequency (Fs/4), since the high frequency components are not as useful for similarity calculations as lower frequency components. The resulting vector characterizes the spectral content of a window.

Other compression techniques such as the Moving Picture Experts Group (MPEG) Layer 3 audio standard could be used for parameterization. MPEG is a family of standards used for coding audio-visual information in a digital compressed format. MPEG Layer 3 uses a spectral representation similar to an FFT and can be used for a distance measurement and avoids the need to decode the audio. Regardless of the parameterization used, the desired result obtained is a compact vector of parameters for every frame.

The type of parameterization is not crucial as long as "similar" sources yield similar parameters. Different parameterizations may prove more or less useful in different applications. For example, experiments have shown that the MFCC representation, which preserves the coarse spectral shape while discarding fine harmonic structure due to pitch, may be appropriate for certain applications. A single pitch in the MFCC domain is represented by roughly the envelope of the harmonics, not the harmonics themselves. Thus, MFCCs will tend to match similar timbres rather than exact pitches, though single-pitched sounds will match if they are present.

Psychoacoustically motivated parameterizations, like those described by Slaney in "Auditory Toolbox", Technical Report #1998–010, Internal Research Corporation, Palo Alto, Calif., 1998, may be especially appropriate if they better reproduce the similarity judgements of human listeners.

Thus, the method in accordance with the present invention is flexible and can subsume most any existing audio analysis method for parameterizing. Further, the parameterization step can be tuned for a particular task by choosing different parameterization functions, or for example by adjusting window size to maximize the contrast of a resulting similarity matrix as determined in subsequent steps.

III. Embedding Parameters In A Matrix

Once the audio has been parameterized, in the next step 104 shown in FIG. 1, the parameters are embedded in a 2-dimensional representation. One way of embedding the audio is described by the present inventor J. Foote in "Visualizing Music and Audio Using Self-Similarity", Proc. ACM Multimedia 99, Orlando, Fla., which is incorporated herein by reference.

In the embedding step a key is a measure of the similarity, or dissimilarity (D) between two feature vectors $v_i$ and $v_j$. The vectors $v_i$ and $v_j$ are determined in the parameterization step for audio frames i and j, discussed previously.

A. Euclidean Distance

One measure of similarity between the vectors is the Euclidean distance in a parameter space, or the square root of the sum of the squares of the differences between the vector parameters which is represented as follows:

$$D_E(i,j)=\|v_i-v_j\|$$

B. Dot Product

Another measurement of vector similarity is a scalar dot product of vectors. In contrast with the Euclidean distance, the dot product of the vectors will be large if the vectors are both large and similarly oriented. The dot product can be represented as follows:

$$D_d(i,j) \equiv v_i 19\ v_j$$

C. Normalized Dot Product

To remove the dependence on magnitude, and hence energy, in another similarity measurement the dot product can be normalized to give the cosine of the angle between the vector parameters. The cosine of the angle between vectors has the property that it yields a large similarity score even if the vectors are small in magnitude. Because of Parsevalls relation, the norm of each spectral vector will be proportional to the average signal energy in a window to which the vector is assigned. The normalized dot product which gives the cosine of the angle between the vectors utilized can be represented as follows:

$$D_c(i,j) \equiv (v_i \cdot v_j)/\|v_i\|\|v_j\|$$

D. Normalized Dot Product With Windowing

Using the cosine measurement means that narrow windows identifying mostly vectors with low energy, such as those containing silence, will be spectrally similar, which is generally desirable. The narrow windows identifying vectors with low energy, or feature vectors, will occur at a rate much faster than typical musical events in a musical score, so a more desirable similarity measure can be obtained by computing the vector correlation over a larger window w. The larger window also captures an indication of the time dependence of the vectors. For a window to have a high similarity score, vectors in a window must not only be similar but their sequence must be similar as well. A measurement of the similarity of vectors $v_i$ and $v_j$ over a window w can be represented as follows:

$$D(i,j,w) \equiv 1/w \sum_{k=0}^{w-1} D(i+k, j+k)$$

Considering a one-dimensional example, the scalar sequence (1,2,3,4,5) has a much higher cosine similarity score with itself than with the sequence (5,4,3,2,1).

Note that the dot-product and cosine measures grow with increasing vector similarity while Euclidean distance approaches zero. To get a proper sense of similarity between the measurement types, the Euclidean distance can be inverted. Other reasonable distance measurements can be used for distance embedding, such as statistical measures or weighted versions of the metric examples disclosed previously herein.

E. Embedded Measurements In Matrix Form

The distance measure D is a function of two frames, or instances in the source signal. It may be desirable to consider the similarity between all possible instants in a signal. This is done by embedding the distance measurements D in a two dimensional matrix representation S. The matrix S contains the similarity calculated for all frames, or instances, or for all the time indexes i and j such that the i,j element of the matrix S is D (i,j). In general, S will have maximum values on the diagonal because every window will be maximally similar to itself.

The matrix S can be visualized as a square image such that each pixel i,j is given a gray scale value proportional to the similarity measure D(i,j) and scaled such that the maximum value is given the maximum brightness. These visualizations enable the structure of an audio file to be clearly seen. Regions of high audio similarity, such as silence or long sustained notes, appear as bright squares on the diagonal. Repeated figures, such as themes, phrases, or choruses, will be visible as bright off-diagonal rectangles. If the music ha a high degree of repetition, this will be visible as diagonal stripes or checkerboards, offset from the main diagonal by the repetition time.

Figure 2:
FIG. 2 shows the musical score for the first bars of Bach's Prelude No. 1.
Figure 3A:
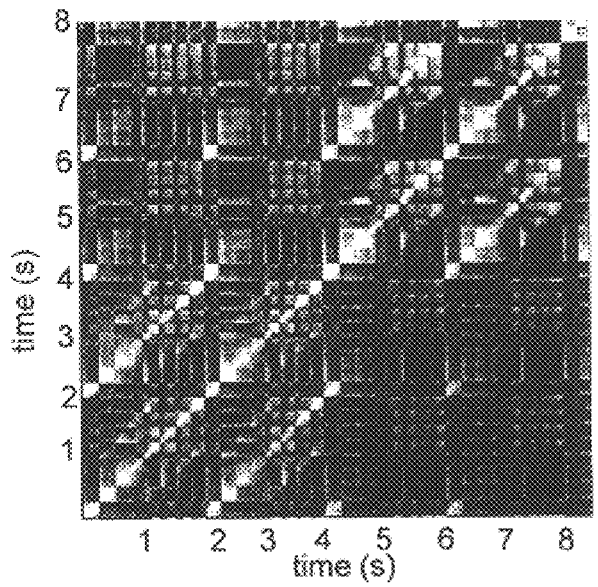
FIGS. 3A and 3B provide a visualization of the distance matrix for the first few seconds taken from a performance of the bars of FIG. 2.
Figure 3B:
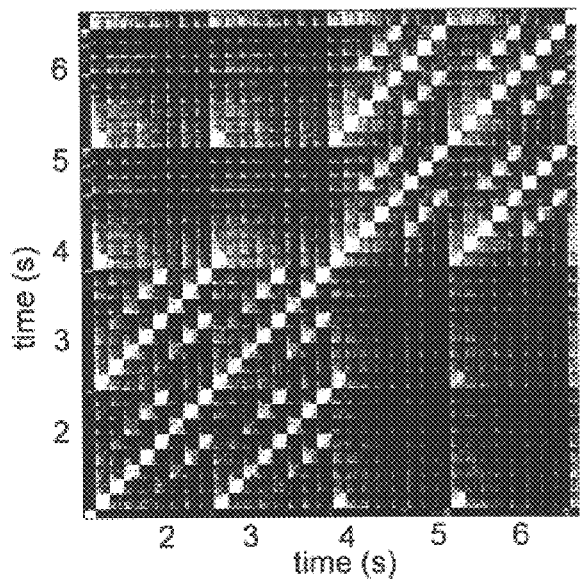

FIG. 2 shows the musical score for the first bars of Bach's Prelude No. 1 in C Major, from The Well-Tempered Clavier, BVW 846. FIG. 3A shows a visualization of a 1963 piano performance by Glenn Gould from the bars of the composition shown in FIG. 2. FIG. 3A provides a visualization of the distance matrix for the first few seconds taken from a performance of the bars of FIG. 2. In the visualizations of FIG. 3A, as well as subsequent visualizations, image rather than matrix coordinate conventions are used, so the origin is at the lower left and time increases both with height and to the right. FIG. 3B shows an acoustic realization from Musical Instrument Digital Interface (MIDI) protocol data for the composition shown in FIG. 2. The visualizations in FIGS. 3A and 3B make both the structure of the piece and details of the performance visible.

The musical structure is clear from the repetitive motifs. Multiples of the repetition time can be seen in the off-diagonal stripes parallel to the main diagonal in FIGS. 3A and 3B. In the first few bars of the score shown in FIG. 2, the repetitive nature of the piece is made clear. In the visualizations of FIG. 3A, approximately 34 notes can be seen as squares along the diagonal. Repetition of the notes is visible in the off-diagonal stripes parallel to the main diagonal. The repeated notes are visible in the off-diagonal stripes parallel to the main diagonal. The stripes are visible beginning at 0, 2, 4 and 6 seconds in FIG. 3A.

FIG. 3B visualizes a similar excerpt, but from a MIDI realization using a passable piano sample with a strict tempo. Beginning silence is visible as a bright square at the lower left which has a high self-similarity, but low cross-similarity with remaining non-silent portions as can be seen by the dark squares projected both horizontally and vertically beginning at the origin of the visualization. Here, unlike with the human performance shown in FIG. 3A, all notes have exactly the same duration and articulation.

F. Slanted Matrix

To simplify computations for determining components of a matrix such as S, the similarity measurements D can be represented in a "slanted" domain matrix L(i,l) where l is a lag value l=i−j. The degree of simplification using the slanted matrix is particularly true in a number of applications presented herein later, where the similarity determination is only required for relatively small lags and not all combinations of i and j. Computing the matrix L only for small, non-negative values of l can result in substantial reductions in computation and storage.

IV. Kernel Correlation

The next step 106 which may be taken, as illustrated in FIG. 1, is to determine the degree of change or novelty between distance measurements. The structure of the matrix S is a key in the determination of the degree of change or novelty measurement. As an example of how S can be used to determine novelty, consider a simple song having two successive notes of different pitch, for example a cuckoo-call. When visualized, S for this two note example will look like a 2×2 checkerboard. White squares on the diagonal correspond to the notes, which have high self-similarity. Black squares on the off-diagonals correspond to regions of low cross-similarity. Assuming we are using the normalized dot product, or cosine of the angle between vectors for a difference determination, similar regions will be close to 1, while dissimilar regions will be closer to −1.

Finding the instant when the notes change in S for the cuckoo call is as simple as finding the center of the checkerboard. This can be done by correlating S with a kernel that itself looks like a checkerboard, termed a "checkerboard" kernel. The simplest is the following 2×2 unit kernel:

$$\begin{bmatrix} 1 & -1 \\ -1 & 1 \end{bmatrix}$$

Other kernels can be used. For example, the unit checkerboard kernel can be decomposed into "coherence" and "anticoherence kernels as follows:

$$\begin{bmatrix} 1 & -1 \\ -1 & 1 \end{bmatrix} = \begin{bmatrix} 1 & 0 \\ 0 & 1 \end{bmatrix} - \begin{bmatrix} 0 & 1 \\ 1 & 0 \end{bmatrix}$$

The first "coherence" term measures the self-similarity on either side of the center point. This will be high when both regions of the matrix S are self-similar. The second "anticoherence" term measures the cross-similarity between the two regions. The cross-similarity will be high when the two regions are substantially similar, or when there is little difference across the center point. The difference between the self-similarity and the cross-similarity estimates the novelty of the signal at the center point. The difference value will be high when the two regions are self-similar, but different from each other.

Larger kernels are easily constructed by forming the Kronecker product of a unit kernel with a matrix of ones. An example of such a product is as follows:

$$\begin{bmatrix} 1 & -1 \\ -1 & 1 \end{bmatrix} \otimes \begin{bmatrix} 1 & 1 \\ 1 & 1 \end{bmatrix} = \begin{bmatrix} 1 & 1 & -1 & -1 \\ 1 & 1 & -1 & -1 \\ -1 & -1 & 1 & 1 \\ -1 & -1 & 1 & 1 \end{bmatrix}$$

Figure 4:
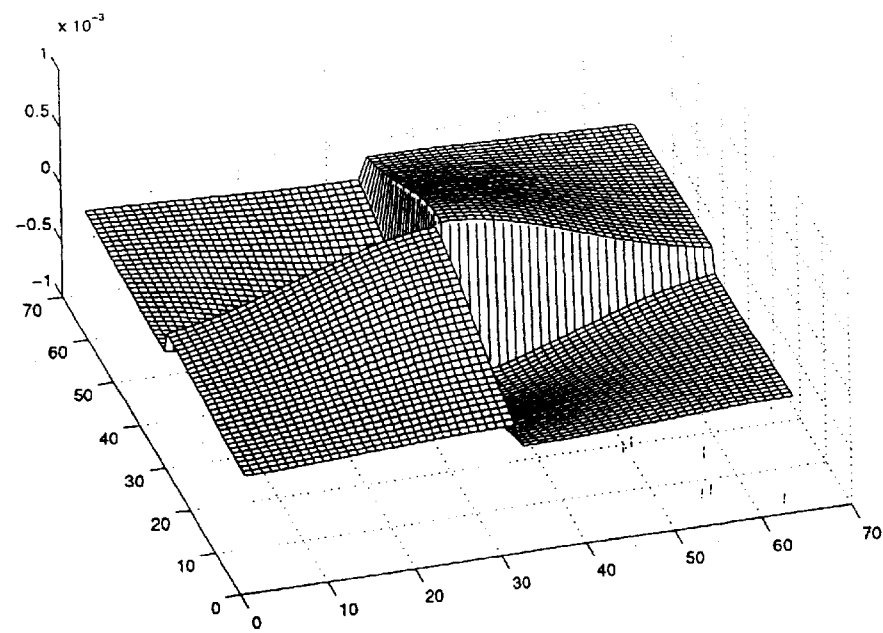
FIG. 4 shows a 3-dimensional plot of a 64×64 checkerboard kernel with a radial Gaussian taper.

Kernels can be smoothed to avoid edge effects using windows, such as a Hamming, that taper toward zero at the edges. For experimental values presented subsequently herein, a radially-symmetrical Gaussian function is used. FIG. 4 shows a 3-dimensional plot of a 64×64 checkerboard kernel with a radial Gaussian taper having sigma=32.

Correlating a checkerboard kernel with the similarity matrix S results in a measure of novelty, or novelty score 108 as shown in FIG. 1. To visualize how the measure works, imagine sliding the kernel C along the diagonal of the example from FIG. 3B and summing the element-by-element product of the kernel C and S. When the kernel C is over a relatively uniform region, such as a sustained note, the positive and negative regions. will tend to sum to zero. Conversely, when the kernel C is positioned exactly at the crux of the checkerboard, the negative regions will multiply the regions of low cross-similarity, and the overall sum will be large. Thus, calculating this correlation along the diagonal of S gives a time-aligned measure of audio novelty D(i), where i is the frame number, hence time index, corresponding to the original source audio. The novelty D(i) can be represented as follows:

$$D(i) = \sum_{m=-L/2}^{L/2} \sum_{n=-L/2}^{L/2} C(m, n) S(i+m, i+n)$$

By convention, the kernel C has a width (lag) of L and is centered on 0,0. For computation, S can be zero-padded to avoid undefined values, or, as in the present examples, only computed for the interior of the signal where the kernel overlaps S completely. Note that only regions of S with a lag of L or smaller are used, so the slant representation is particularly helpful. Also, typically both S and the kernel C are symmetric, so only one-half of the values under the double summation (those for $m \geq n$) need be computed.

Figure 5:
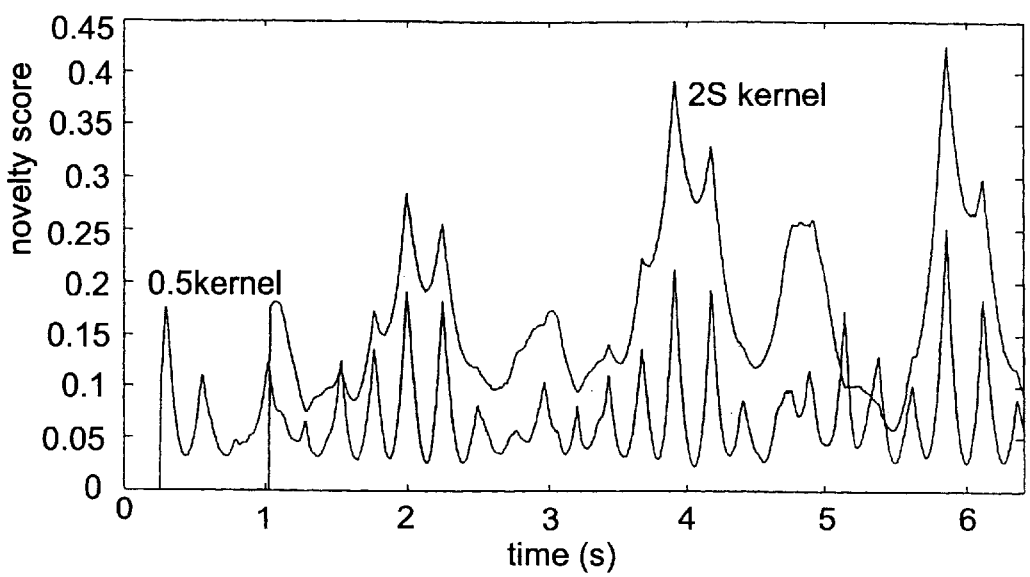
FIG. 5 shows the novelty score computed on the similarity matrix S for the Gould performance from FIG. 3A.

The width of the kernel L directly affects the properties of the novelty measure. A small kernel detects novelty on a short time scale, such as beats or notes. Increasing the kernel size decreases the time resolution, and increases the length of novel events that can be detected. Larger kernels average over short-time novelty and detect longer structure, such as musical transitions like that between verse and chorus, key modulations, or symphonic movements. FIG. 5 shows the novelty score computed on the similarity matrix S for the Gould performance from FIG. 3A. Results using two kernel widths are shown. The 2S kernel plot was offset slightly upwards scale for clarity.

The shorter kernel 0.5S kernel clearly picks out the note events, although some notes are slurred and are not as distinct. In particular in Gould's idiosyncratic performance, the last three notes in each phrase are emphasized with a staccato attack. Note how this system clearly identifies the onset of each note without analyzing explicit features such as pitch, energy, or silence.

The longer kernel yields peaks at the boundaries of 8-note phrases, at 2, 4 and 6 seconds. Each peak occurs exactly at the downbeat of the first note in each phrase. Note that although the present method has no a-priori knowledge of musical phrases or pitch, it is finding perceptually and musically significant points.

V. Extracting Segment Boundaries

As indicated previously, extrema in the novelty score correspond to large changes in the audio characteristics. These novelty points often serve as good boundaries for segmenting the audio, as the audio will be similar within boundaries and significantly different across them. The novelty points also serve as useful indexes into the audio as they indicate points of significant change.

A. Thresholding

Finding the segment boundaries is a simple matter of finding the peaks in the novelty score. A simple approach is to find points where the score exceeds a local or global threshold. This is illustrated in step 110 of FIG. 1, where thresholds in the novelty score 108 are determined to identify segment boundaries 112. For time precision segmenting determinations, maximum or zero-slope points above the threshold locate peaks exactly.

A useful way of organizing the index points is in a binary tree structure constructed by ranking all the index points by novelty score. The highest-scoring index point becomes the root of the tree, and divides the signal into left and right sections. The highest-scoring index point in the left and right sections become the left and right children of the root node, and so forth recursively until no more index points are left above the threshold. The tree structure facilitates navigation of the index points, making it easy to find the nearest index from an arbitrary point by walking the tree. In addition, the tree can be truncated at any threshold level to yield a desired number of index points, and hence segments. An enhancement to the tree approach is to reduce the size of the kernel as the tree is descended, so lower-level index points reveal increasingly fine time granularity.

Figure 6:
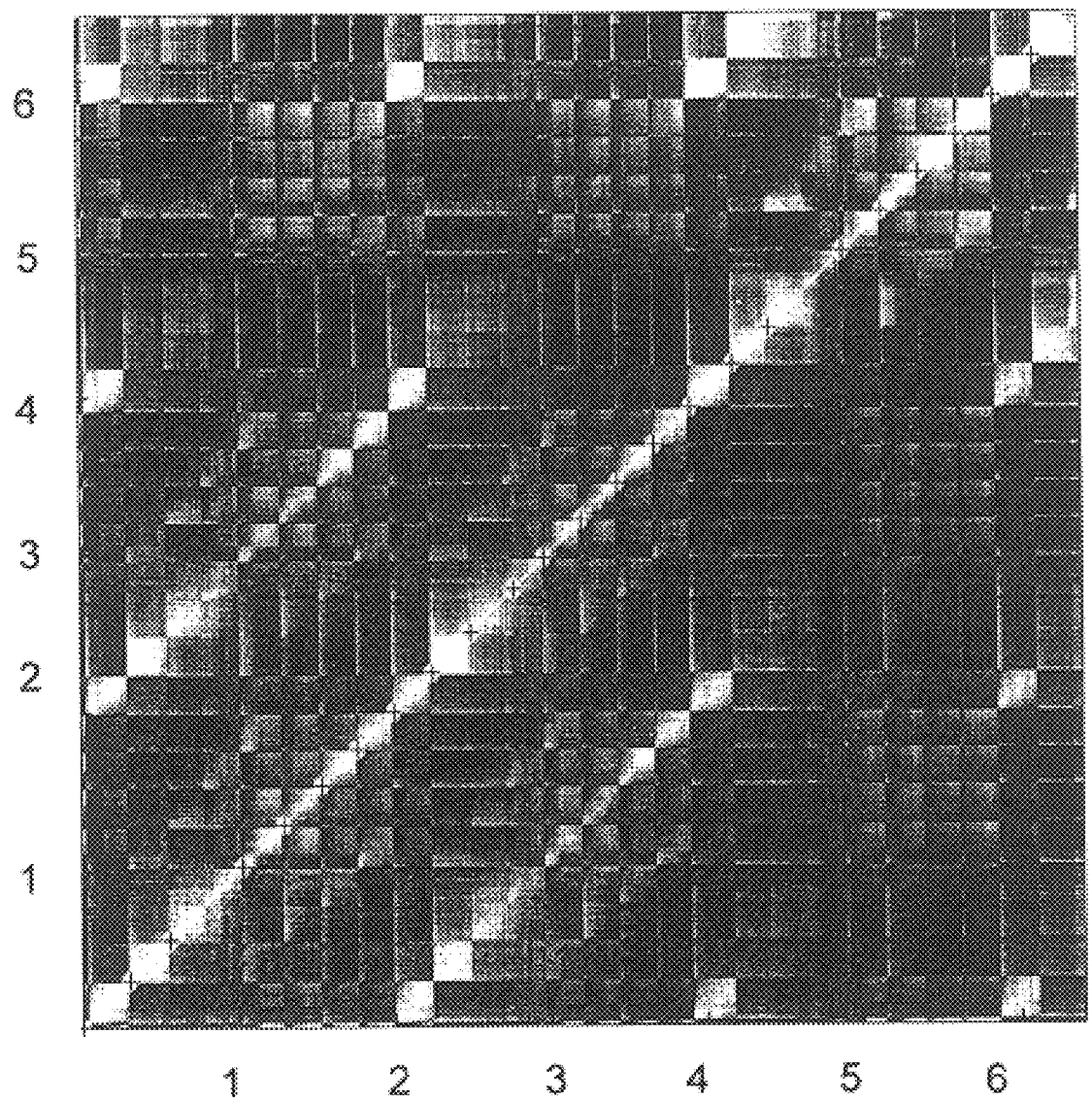
FIG. 6 shows the segment boundaries extracted from a ½ second kernel of the first 10 seconds of the Gould performance shown in FIG. 3A.

FIG. 6 shows the segment boundaries extracted from a ½ second kernel of the first 10 seconds of the Gould performance shown in FIG. 3A. Boundaries are indicated with a ⊕. Individual notes are clearly isolated, except for the fourth note which has been slurred with the third.

The segment boundaries identified in FIG. 6 work well for musical notes, but cannot be expected to segment speech into words unless they are spectrally different. Speech is different because words are often not well delineated acoustically. For example, the phrase "that's stupid" would be segmented into that"s-s" and "tupid" because there is little acoustic differences in the "s" sounds of the two words. Note that this would likely be the segmentation that a non-English speaker would choose.

B. Speech/Music and Speaker Segmentation

Figure 7:
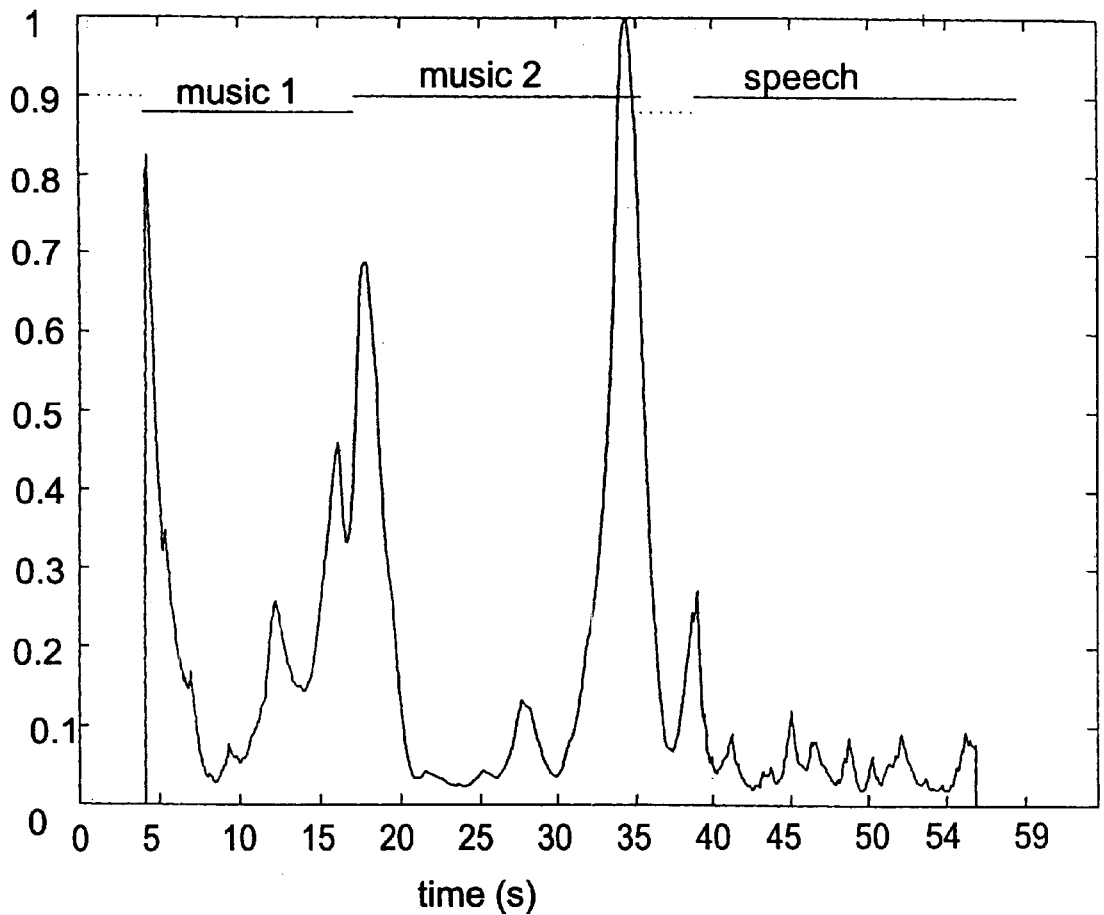
FIG. 7 shows the similarity matrix for a 56-second segment of the soundtrack to the motion picture Raiders of the Lost Ark.

Besides music, the method in accordance with the present invention works for segmenting audio into speech and music components, and to a lesser extent segmenting speech in the audio by speaker. FIG. 7 shows the audio novelty score for the first minute of "Animals Have Young", MPEG Requirements Group, video V14 from the MPEG-7 content set, Description of MPEG-7 Content Set, Doc. ISO/MPEG N2467, MPEG Atlantic City Meeting, October 1998. This segment contains 4 seconds of introductory silence, followed by a short musical segment with the production logo. At 17 seconds, the titles start, and very different theme music commences. At 35 seconds, this fades into a short silence, followed by female speech over attenuated background music for the remainder of the segment. The largest peak occurs directly on the speech/music transition at 35 seconds. The two other, major peaks occur at the transitions between silence and music at 4 seconds and between the introduction and theme music at 17 seconds.

Using a naive spectral distance measure, a novelty score can't in general discriminate between speakers unless they have markedly different vocal spectra, such as between genders. Often, however, there are enough differences for the similarity measure to find. In particular, a novelty score in accordance with the present invention can often be used to find differences in speaking style and not, as in previous approaches, differences between known vocal characteristics of particular speakers or speaker models. Though not demonstrated here, it is a straightforward matter to use a distance metric tuned to discriminate speakers by vocal characteristics, for example based on cepstral coefficients, or using the methods disclosed in J. T. Foote and H. F. Silverman, "A Model Distance Measure For Talker Clustering And Identification", *Proc. ICASSP*, vol. S1, pp. 317–320, Adelaide, Australia, April 1994.

C. Automatic Beat Tracking and the "Beat Spectrum"

Another application for the embedded audio parameters as illustrated in FIG. 1 is for beat tracking as illustrated by step 114 of FIG. 1 which can be provided as an alternative to performing a kernel correlation to obtain a novelty score. For beat tracking in accordance with the present invention, both the periodicity and relative strength of beats in the music can be derived. Measurement of self-similarity as a function of the lag to identify beats in music will be termed herein the "beat spectrum" $B(1)$. Peaks in the beat spectrum correspond to periodicities in the audio. A simple estimate of the beat spectrum can be found by summing S along the diagonal as follows:

$$B(l) \approx \sum_{k \in R} S(k, k+l)$$

$B(0)$ is simply the sum along the main diagonal over some continuous range R, $B(1)$ is the sum along the first sub-diagonal, and so forth. Once again the slant representation is especially convenient as diagonal sums are simply the sum across columns, or the projection onto the lag axis.

Figure 8:
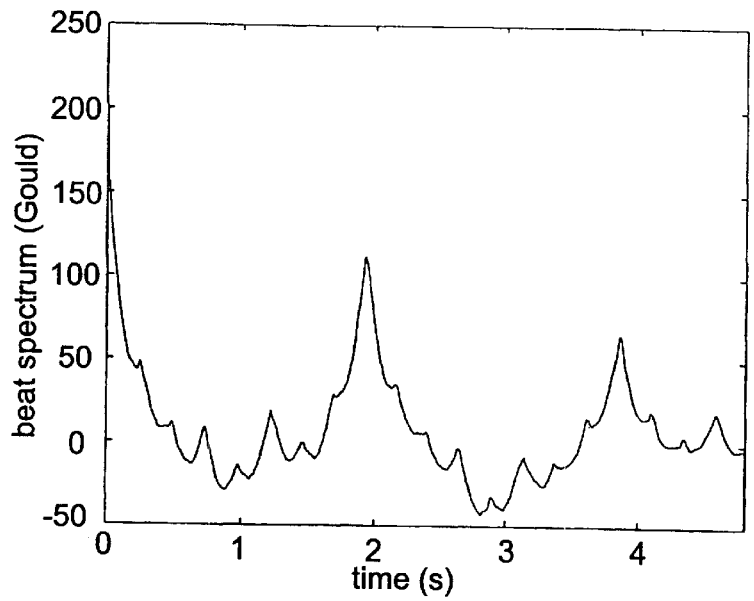
FIG. 8 shows an example of a beat spectrum B(1) computed for a range of 3 seconds in the Gould performance shown in FIG. 3A.

FIG. 8 shows an example of a beat spectrum $B(1)$ computed for a range of 3 seconds in the Gould performance illustrated in FIG. 3A. The periodicity of each note can be clearly seen, as well as the strong 8-note periodicity of the phrase with a sub-harmonic at 16 notes. Especially interesting are the peaks at notes 3 and 5. These come from the three-note periodicity of the eight-note phrase. In each phrase, notes 3 and 6, notes 4 and 7, and notes 5 and 8 are the same.

A more robust definition of the beat spectrum is the auto-correlation of S as follows:

$$B(k, l) = \sum_{i,j} S(i, j) S(i+k, j+l)$$

But, because $B(k,1)$ will be symmetrical, it is only necessary to sum over one variable, giving the one dimensional result $B(1)$. The beat spectrum $B(1)$ provides good results across a range of musical generes, tempos and rhythmic structures.

Figure 9:
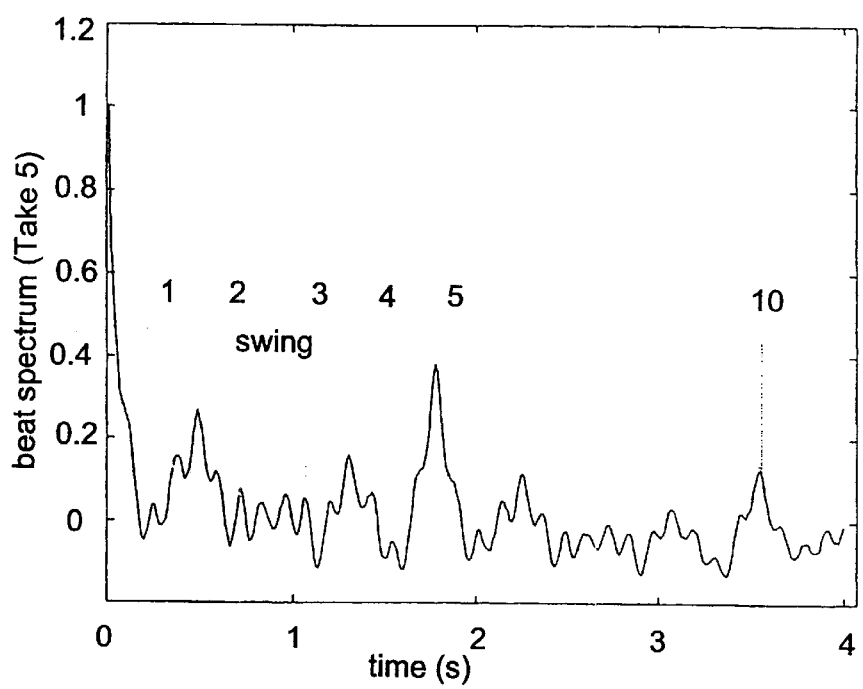
FIG. 9 shows a beat spectrum computed from the first 10 seconds of the jazz composition Take 5 by the Dave Brubeck Quartet.

FIG. 9 shows a beat spectrum computed from the first 10 seconds of the jazz composition Take 5 by the Dave Brubeck Quartet. Apart from being in an unusual 5/4 time signature, this rhythmically sophisticated piece requires some interpretation. First not that no obvious periodicity occurs at the actual beat tempo, the beat tempo being marked by the solid vertical lines in FIG. 9. Rather there is a marked periodicity at 5 beats, and a corresponding subharmonic at 10. Jazz aficionados know that "swing" is the subdivision of beats into non-equal periods rather than "straight" equal eighth-notes. The beat spectrum clearly shows that each beat is subdivided into near perfect triplets. The triplets are indicated with dotted lines spaced 1/3 of a beat apart between the second and third beats. A clearer illustration of "swing" would be difficult to provide.

Using the beat spectrum in combination with the narrow kernel novelty score gives excellent estimates of musical tempo. Peaks in the beat spectrum give the fundamental rhythmic periodicity, while peaks in the novelty score give the precise downbeat time or phase. Correlating the novelty score with a comb-like function with a period from the beat spectrum yields a signal that has strong peaks at every beat. Strong off-beats and syncopations can be then deduced from secondary peaks in the beat spectrum. Conventional approaches for beat tracking look for absolute acoustic attributes. For example energy peaks across particular sub-bands. The beat tracking method in accordance with the present invention is more robust since the only signal attribute needed is a repetitive change.

Just as the power spectrum discards phase information, the beat spectrum discards absolute timing information. In accordance with the present invention, the beat spectrum is introduced for analyzing rhythmic variation over time. A spectrogram images Fourier analysis of successive windows to illustrate spectral variation over time. Likewise, a beat spectrogram presents the beat spectrum over successive windows to display rhythmic variation over time.

The beat spectrum is an image formed by successive beat spectra. Time is on the x axis, with lag time on the y axis. Each pixel in the beat spectrograph is colored with the scaled value of the beat spectrum at the time and lag, so that beat spectrum peaks are visible as bright bars in the beat spectrogram. The beat spectrograph shows how tempo varies over time. For example, an accelerating rhythm will be visible as bright bars that slope downward, as the lag time between beats decreases with time.

The beat spectrum has interesting parallels with the frequency spectrum. First, there is an inverse relation between the time accuracy and the beat spectral precision. This is because you need more periods of a repetitive signal to more precisely estimate its frequency. The longer the summation range, the better the beat accuracy, but of course the worse the temporal accuracy. Technically, the beat spectrum is a frequency operator, and therefore does not commute with a time operator. In particular, if the tempo changes over the analysis window, it will "smear" the beat spectrum. Analogously, changing a signal's frequency over the analysis window will result in a smeared frequency spectrum. Thus beat spectral analysis, just like frequency analysis, is a trade-off between spectral and temporal resolution.

VI. Applications

The ability to reliably segment and beat-track audio has a number of useful applications. Several are described to follow. Note that the method of the present invention can be used for any time-dependent media, such as video, where some measure of point-to-point similarity can be determined.

A. Audio Segmentation and Indexing

As demonstrated previously, the method in accordance with the present invention provides good estimates of audio segment boundaries. The segment boundary locations are useful for an application where one might wish to play back only a portion of an audio file. For example, in an audio editing tool, selection operations can be constrained to segment boundaries so that the selection region does not contain factional notes or phrases. Such an audio editing tool would be similar to "smart cut and paste" in a text editor that constrains selection regions to entire units such as words or sentences. The segment size can be adjusted to the degree of zoom so that the appropriate time resolution is available. When zoomed in, higher resolution (perhaps from the lower levels of the index tree) would allow note-by-note selection, while a zoomed-out view would allow selection by phrase or section. Similarly, segmenting audio greatly facilitates audio browsing: a "jump-to-next-segment" function allows audio to be browsed faster than real time. Because segments will be reasonably self-similar, listening to a small part of the segment will give a good idea of the entire segment.

B. Audio Summarization and Gisting

The audio segmentation and indexing approach can be extended to an automatic summarization. For example, by playing on the start of each segment as in the "scan" feature on a CD player. In fact, segments can be clustered so that only significantly novel segments are included in the summary. Segments too similar to a segment already in the summary could be skipped without losing too much information. For example, when summarizing a popular sing, repeated instances of the chorus could be excluded from the summary.

A further refinement of audio summarization could be audio "gisting", or finding a short segment that best characterizes the entire work. A number of on-line music retailers offer a small clip of their wares for customers to audition. The clips are typically just a short interval taken near the beginning of each work and may not be representative of the entire piece. Simple processing of a similarity matrix in accordance with the present invention can find the segment most similar throughout the entire work. Averaging the similarity matrix over the interval corresponding to each segment gives a measure of how well the segment represents the entire work. The highest-scoring segment would thus be the best candidate for a sample clip.

C. Classification and Retrieval

Classification and retrieval, such as classification of advertisements in an audio portion of a TV broadcast, will work better using the method in accordance with the present invention on shorter audio segments with uniform features than long heterogeneous data. In streaming audio like a radio broadcast of a TV soundtrack, it is rarely clear when one segment begins and ends. When the audio is segmented, each segment is guaranteed to be reasonably self-similar and hence homogeneous. Thus, segments determined in accordance with the method of the present invention will be good units to cluster by similarity, or classify as in the methods disclosed by the present inventor J. Foote in "content-Based Retrieval of Music and Audio" Multimedia Storage and Archiving Systems II, *Proc. SPIE*, Vol. 3229, Dallas, Tex. 1997.

Visualizations in accordance with the method of the present invention show how acoustically similar passages can be located in an audio recording. Similarity can also be found across recordings as well as within a single recording. A classification procedure using the present invention to segment the audio would be immediately useful to identify known music or audio located in a longer file. For example, it would be a simple matter to find the locations of the theme music in a news broadcast, or the times that advertisements occur in a TV broadcast if the audio was available. The similarity measure could be computed between all frames of the source commercial and the TV broadcast resulting in a rectangular similarity matrix. Commercial onset times would be determined by thresholding the similarity matrix at some suitable value. Even if the commercials were not known in advance, they could be detected by their repetition. The structure of most music is sufficient to characterize the work.

Human experts have been known to identify music and sound by visual structure alone. As proof of human ability to identify music by visualization, Victor Zue of MIT teaches a course in "reading" sound spectrographs. Further, Arthur Lintgen of Philadelphia was able to distinguish unlabeled classical recordings by identifying the softer and louder passages visible in LP grooves. See, Johnson, P. "sci.skeptic FAQ", Section 0.6.2 www.faas.org/faqs/skeptic-faq/, 1999. These examples indicate that using visualization of matrices created in accordance with the present invention might be useful for music retrieval by similarity.

Figure 10A:
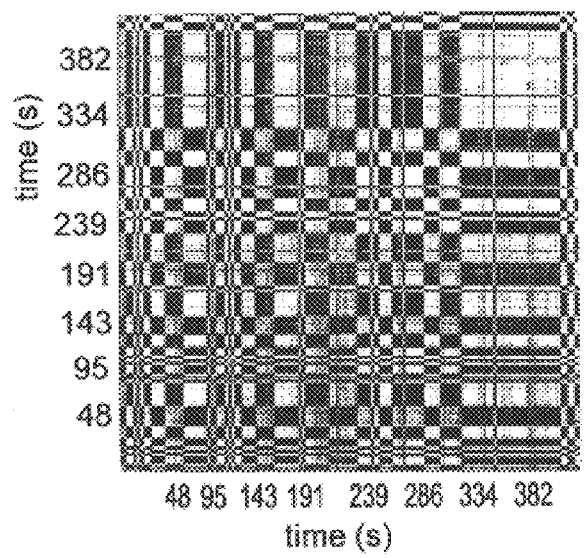
FIGS. 10A and 10B show the self-similarity of the entire first movement of Beethoven's Symphony No. 5.
Figure 10B:
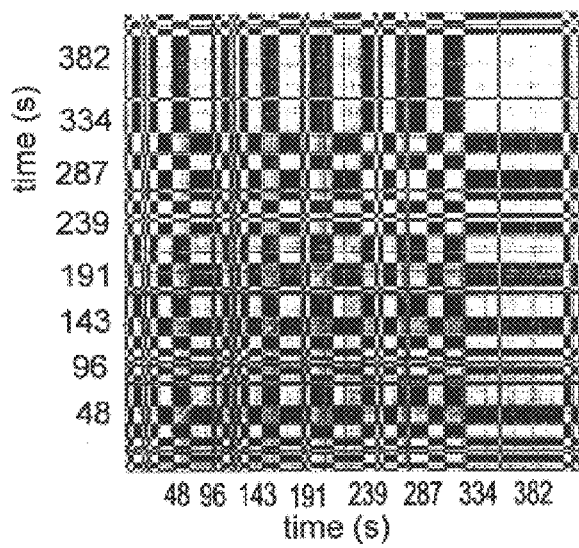

Not only can acoustically similar audio portions from different performances be located, but structurally similar audio can be identifiable by comparing similarity matrices. For example, different performances of the same symphonic movement will have a similar structural visualization regardless of how or when they were performed or recorded, or indeed the instruments used. FIGS. 10A and 10B show the self-similarity of the entire first movement of Beethoven's Symphony No. 5. The two visualizations shown are each from a different performance featuring different conductors, Herbert von Karajan and the Berlin Philharmonic in FIG.

10A, and Carlos Kleiber and the Vienna Philharmonic in FIG. 10B. Because of the length of the piece is more than seven minutes, much fine detail is not observable. Each pixel represents nearly a second of music, so the famous opening theme occurs-in only the first few pixels. The primary visible structure is the alternation of softer string passages with louder tutti sections where all instruments play, for example in the sustained climax near the end of the movement. FIGS. 10A and 10B illustrate how visualizations capture both the essential structure of the piece as well as variations of individual performers.

D. Automatic Audio Alignment

As illustrated in FIGS. 10A and 10B, a benefit of the novelty score in accordance with the present invention is that it will be reasonably invariant across different realizations of the same music. Because the novelty score is based on self-similarity, rather than particular acoustic features, different performances of the same music should have similar novelty scores. Thus Bach's Air on a G String should result in a novelty score that is similar whether played on a violin or a kazoo.

One application for novelty scores for different realizations of the same music is to use the scores to align the music. The time axis of one realization's novelty score can be warped to match another using dynamic programming. The warping function then serves as a tempo map. Using a non-linear time scale modification, one piece could be played back with the tempo of the other. For an example of audio time and pitch scaling methods, see S. Sprenger, "Time and Pitch Scaling of Audio Signal s", www.dspdimension.com/html/timepitch.html.

In general, segment boundaries are useful landmarks for time-scale modification, just as "control points" are used for image "morphing". Another application might be to play back an audio piece along with unpredictably timed events such as progress through a video game. Longer segments could be associated with particular stages, such as a game level or virtual environment location. As long as the user stayed at that stage, the segment would be looped. Moving to a different stage would cause another segment to start playing.

E. Automatic Tempo Extraction

Knowing the time location of landmarks allows synchronization of external events to the audio. For example, an animated character could beat time or dance to a musical tempo. Video clips could be automatically sequenced to an existing musical soundtrack. In another useful application, the lip movements of animated characters could be synchronized to speech or singing. Conversely, audio can be matched to an existing time sequence, by warping segments so that audio landmarks, or segment boundaries occur at given times. Examples include creating a soundtrack for an existing animation or video sequence. Another application might be to arrange songs by similar tempo so that the transition between them is smooth. This is a process that is done manually by expert DJs and also for vendors of "environmental" music, such as Muzak™.

F. Music Analysis By Synthesis (And Synthesis From Analysis)

Figure 11:
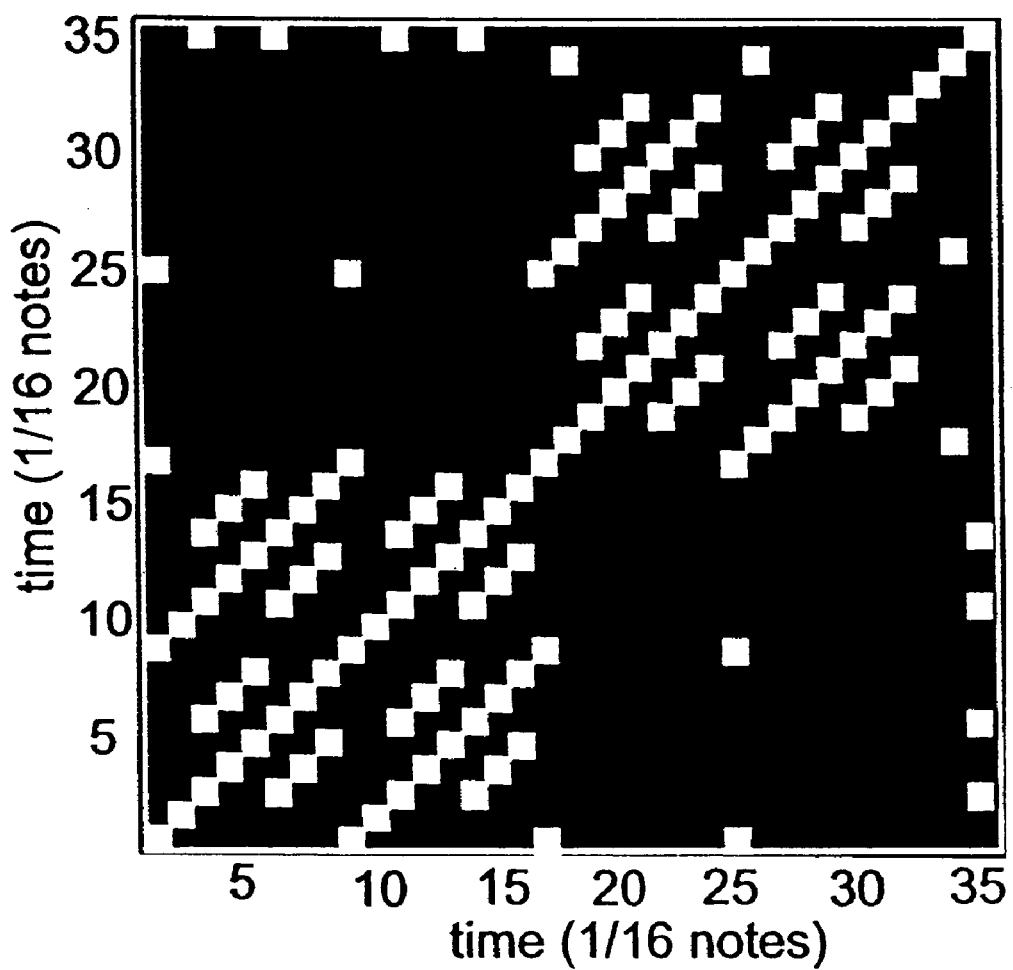
FIG. 11 shows a similarity image of the Bach prelude for which the music bars are shown in FIG. 2, with data derived directly from MIDI data.

As another application of the method in accordance with the present invention, FIG. 11 shows a similarity image of the Bach prelude for which the music bars are shown in FIG. 2, with data derived directly from MIDI data. In FIG. 11, no acoustic information was used. Matrix entries (i,j) were colored white if note i was the same pitch as note j, and left black otherwise. Comparing this image with the acoustic similarity images of FIG. 3A, clearly the structures of both visualizations are highly similar, indicating that they do indeed capture the underlying structure of the music. For example, FIGS. 3A and 11 show two realizations of the same Bach piece, one by Glenn Gould in FIG. 3A and another which is a computer rendition of an MIDI file in FIG. 11. Given the audio of a particular performance and a MIDI file representation of the same piece, as in FIGS. 4 and 5, it would be possible to warp the similarity matrix from the known-tempo MIDI rendition to match that of the original performance. The warping function would then serve as a tempo map, allowing the MIDI file to be played back with the temp of the original. Other compelling applications of the method in accordance with the present invention, would result from the ability to get note-by-note or event-by-event indexes into the source audio.

Reliably segmenting music by note or phrase allows substantial compression of the audio. For example, a repeated series of notes can be represented by the first note and the repetition times. If the second chorus is nearly identical to the first, it need not be stored, only a code to indicate repetition of the first is needed. The MPEG-4 structured audio standard supports exactly this kind of representation, but previously there have been few reliable methods to analyze the structure of the existing audio.

Although the present invention has been described above with particularity, this was merely to teach one of ordinary skill in the art how to make and use the invention. Many additional modifications will fall within the scope of the invention, as that scope is defined by the claims which follow.

What is claimed is:

1. A method for identifying novelty points in a source audio signal comprising the steps of:

sampling the audio signal and dividing the audio signal into windowed portions with a plurality of samples taken from within each of the windowed portions;

parameterizing the windowed portions of the audio signal by applying a first function to each windowed portion to form a vector parameter for each window; and embedding the parameters by applying a second function which provides a measurement of similarity between the parameters.

2. The method of claim 1, wherein the first function used in the parameterization step comprises a log magnitude of a Fast Fourier Transform (FFT).

3. The method of claim 1, wherein the first function used in the parameterization step comprises a Mel-Frequency Cepstral Coefficients (MFCC) analysis.

4. The method of claim 1, wherein the first function used in the parameterization step comprises a Moving Picture Experts Group (MPEG) audio standard.

5. The method of claim 1, wherein the second function used in the embedding step comprises a Euclidean distance measurement:

$$D_E(i,j) = \|v_i - v_j\|$$

wherein $D_E(i,j)$ represents the Euclidean distance between one of the pairs of vector parameters with vectors located at a first integer location i and a second integer location j, $v_i$ represents one of the vector parameters from the first integer location i, and $v_j$ represents one of the vector parameters from the second integer location j.

6. The method of claim 1, wherein the second function used in the embedding step comprises a dot product:

$$D_d(i,j) = v_i \cdot v_j$$

wherein $D_d(i,j)$ represents the dot product between one of the pairs of vector parameters with vectors located at a first integer location i and a second integer location j, $v_i$ represents one of the vector parameters from the first integer location i, and $v_j$ represents one of the vector parameters from the second integer location j.

7. The method of claim 1, wherein the second function used in the embedding step comprises a normalized dot product:

$$D_c(i,j) \equiv (v_i \cdot v_j)/\|v_i\|\|v_j\|$$

wherein $D_c(i,j)$ represents the normalized dot product between one of the pairs of vector parameters with vectors located at a first integer location i and a second integer location j, $v_i$ represents one of the vector parameters from the first integer location i, and $v_j$ represents one of the vector parameters from the second integer location j.

8. The method of claim 1, wherein the embedded parameters are provided in a form of a matrix S(i,j), wherein i identifies rows of the matrix and j identifies columns of the matrix, the method further comprising the step of:

identifying a slanted domain matrix L(i,l) from the matrix S(i,j), wherein l is a lag value l=i–j.

9. The method of claim 1, wherein the embedded parameters are provided in a form of a matrix S, the method further comprising the step of:

correlating the matrix S with a matrix kernel C to determine a novelty score.

10. The method of claim 9, wherein the matrix kernel C comprises a 2×2 checkerboard kernel defined as follows:

$$\begin{bmatrix} 1 & -1 \\ -1 & 1 \end{bmatrix}.$$

11. The method of claim 9, wherein the matrix kernel C comprises a coherence kernel defined as follows:

$$\begin{bmatrix} 1 & 0 \\ 0 & 1 \end{bmatrix}.$$

12. The method-of claim 9, wherein the matrix kernel C comprises an anti-coherence kernel defined as follows:

$$\begin{bmatrix} 0 & 1 \\ 1 & 0 \end{bmatrix}.$$

13. The method of claim 9, wherein the matrix kernel C comprises a checkerboard kernel including four quadrants with ones (1s) in two opposing quadrants and negative ones (–1s) in two opposing quadrants.

14. The method of claim 13, wherein the matrix kernel C comprises the checkerboard kernel smoothed using a function which tapers toward-zero at the edges of the matrix kernel C.

15. The method of claim 14, wherein the function comprises a radially-symmetrical Gaussian taper.

16. The method of claim 9, wherein the matrix kernel C comprises a checkerboard kernel including four quadrants with ones (1s) in two opposing quadrants and zeros (0s) in two opposing quadrants.

17. The method of claim 9, wherein the novelty score D(i), where i is a frame number, is determined as follows:

$$D(i) = \sum_{m=-L/2}^{L/2} \sum_{n=-L/2}^{L/2} C(m,n)S(i+m, i+n)$$

wherein the matrix kernel C has a width of L and is centered at m=0,n=0.

18. The method of claim 9, further comprising the step of:
thresholding the novelty score by determining points in the novelty score above a predetermined threshold.

19. The method of claim 18 further comprising the step of forming a binary tree structure from the points in the novelty score above the predetermined threshold by performing the steps of:

identifying one of the points above the threshold which is highest above the threshold as a root of the binary tree and dividing remaining points from the novelty score above the predetermined threshold into first left and first right points relative to the root point;

identifying a first left subsequent tree point which is highest above the threshold in the first left points and dividing remaining points from the first left points into second left and second right points relative to the left subsequent tree point; and identifying a first right subsequent tree point which is highest above the threshold in the first right points and dividing remaining points from the first right points into third left and third right points relative to the right subsequent tree point.

20. The method of claim 18 further comprising the steps of:

defining segments in the audio signal as groups of points in the novelty score above the threshold with each point in the group adjacent to a point above the threshold; and audio gisting by averaging points in each of the segments and identifying a number of segments with points in the novelty score which are most similar.

21. The method of claim 18 further comprising the steps of:

defining segments in the audio signal as groups of points in the novelty score above the threshold with each point in the group adjacent to a point above the threshold; and indexing the audio signal by defining numbers to identify locations of individual ones of the segments.

22. The method of claim 21 further comprising the step of:
browsing the audio signal by playing a portion of the audio signal at the beginning of each segment.

23. The method of claim 18 further comprising the steps of:

defining segments in the audio signal as groups of points in the novelty score above the threshold with each point in the group adjacent to a point above the threshold; and editing the audio signal by cutting portions of the audio signal which are not part of the segments.

24. The method of claim 18 further comprising the steps of:

defining segments in the audio signal as groups of points in the novelty score above the threshold with each point in the group adjacent to a point above the threshold; and warping the audio signal so that segment boundaries occur at predetermined times in the audio signal.

25. The method of claim 18 further comprising the steps of:

defining segments in the audio signal as groups of points in the novelty score above the threshold with each point in the group adjacent to a point above the threshold; and aligning portions of a video signal to the audio signal based on locations of the segments.

26. The method of claim 9, further comprising the steps of:
defining a beat spectrum by summing points forming a diagonal line in the matrix S;
correlating the novelty score with the beat spectrum; and
identifying peaks in the correlated novelty score and beat spectrum to determine a tempo for music in the audio signal source.

27. The method of claim 1, wherein the embedded parameters are provided in a form of a matrix S, the method further comprising the steps of:
correlating the matrix S with a coherence kernel to determine a first novelty-score;
correlating the matrix S with an anti-coherence kernel to determine a second novelty score; and
determining a difference between the first novelty score and the second novelty score,
wherein the coherence kernel is defined as follows:

$$\begin{bmatrix} 1 & 0 \\ 0 & 1 \end{bmatrix}$$

and, wherein the anti-coherence kernel is defined as follows:

$$\begin{bmatrix} 0 & 1 \\ 1 & 0 \end{bmatrix}.$$

28. The method of claim 1, wherein the embedded parameters are provided in a form of a matrix S, the method further comprising the steps of:
correlating the matrix S with a coherence kernel to determine a first novelty score;
correlating the matrix S with an anti-coherence kernel to determine a second novelty score; and
determining a difference between the first novelty score and the second novelty score,
wherein the coherence and the anti-coherence kernels each comprise four quadrants with ones (1s) in two opposing quadrants and zeros (0s) in two opposing quadrants, wherein the ones (1s) in the coherence kernel are in opposing quadrants from the ones (1s) in the anti-coherence kernel.

29. The method of claim 1, wherein the embedded parameters are provided in a form of a matrix S, the method further comprising the step of:
defining a beat spectrum by summing points forming a diagonal line in the matrix.

30. The method of claim 29, wherein the diagonal line is a main diagonal of the matrix S.

31. The method of claim 29, wherein the diagonal line is a sub-diagonal of the matrix S, wherein the sub-diagonal is parallel to a main diagonal.

32. The method of claim 29 further comprising the step of:
identifying peaks in the beat spectrum to determine a tempo for music in the audio signal source.

33. The method of claim 32 further comprising the steps of:
warping the audio signal so that the tempo of the audio signal matches a tempo of a second audio signal.

34. The method of claim 1, wherein the embedded parameters are provided in a form of a matrix $S(i,j)$, wherein i identifies rows of the matrix and j identifies columns of the matrix, the method further comprising the step of:
auto-correlating the matrix $S(i,j)$ to define a beat spectrum $B(k,l)$, wherein k and l are predetermined integers, as follows:

$$B(k, l) = \sum_{i,j} S(i, j)S(i+k, j+l).$$

35. The method of claim 34 further comprising the step of:
identifying peaks in the beat spectrum to determine a tempo for music in the audio signal source.

36. The method of claim 1, wherein in the step of embedding the parameters, the second function is applied to determine self-similarity between one of the parameters and itself, as well as cross similarity between two different ones of the parameters.

* * * * *